US007657282B2

(12) United States Patent
Suzuki et al.

(10) Patent No.: US 7,657,282 B2
(45) Date of Patent: Feb. 2, 2010

(54) MULTIMODE WIRELESS COMMUNICATION APPARATUS AND HIGH FREQUENCY INTEGRATED CIRCUIT THEREFOR

(75) Inventors: May Suzuki, Kokubunji (JP); Taizo Yamawaki, Tokyo (JP); Satoshi Tanaka, Kokubunji (JP); Akio Yamamoto, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 10/372,269

(22) Filed: Feb. 25, 2003

(65) Prior Publication Data

US 2004/0204038 A1    Oct. 14, 2004

(30) Foreign Application Priority Data

Oct. 23, 2002    (JP) .............................. 2002-307792

(51) Int. Cl.
*H04M 1/00*    (2006.01)
(52) U.S. Cl. .............. 455/552.1; 455/168.1; 455/176.1; 455/188.1; 455/553.1
(58) Field of Classification Search .............. 455/188.1, 455/176.1, 168.1, 552.1, 553.1, 435.2, 435.3, 455/452.2; 379/59
See application file for complete search history.

(56) References Cited

U.S. PATENT DOCUMENTS

| | | | | |
|---|---|---|---|---|
| 4,092,594 A | * | 5/1978 | Baker | 455/154.2 |
| 4,220,922 A | * | 9/1980 | Ikeguchi | 455/182.1 |
| 4,291,414 A | * | 9/1981 | Kimura | 455/164.1 |
| 5,020,093 A | * | 5/1991 | Pireh | 455/552.1 |
| 5,422,931 A | * | 6/1995 | Austin-Lazarus et al. | 455/553.1 |
| 6,011,960 A | * | 1/2000 | Yamada et al. | 455/77 |
| 6,185,418 B1 | * | 2/2001 | MacLellan et al. | 455/418 |
| 6,249,686 B1 | * | 6/2001 | Dvorkin et al. | 455/552.1 |
| 6,389,277 B1 | * | 5/2002 | Salzwedel | 455/414.1 |
| 6,453,172 B1 | * | 9/2002 | Miyashita | 455/552.1 |
| 6,466,803 B1 | * | 10/2002 | Gardner | 455/553.1 |
| 6,597,782 B1 | * | 7/2003 | Marcoux et al. | 379/220.01 |
| 6,640,115 B1 | * | 10/2003 | Fujimoto et al. | 455/567 |
| 6,643,522 B1 | * | 11/2003 | Young | 455/552.1 |
| 6,731,349 B1 | * | 5/2004 | Van Der Wijst | 348/732 |
| 6,804,497 B2 | * | 10/2004 | Kerth et al. | 455/88 |
| 7,046,649 B2 | * | 5/2006 | Awater et al. | 370/338 |
| 2001/0010889 A1 | | 8/2001 | Awater et al. | |

FOREIGN PATENT DOCUMENTS

| | | |
|---|---|---|
| JP | 10-61480 A | 2/1989 |
| JP | 05-160784 | 6/1993 |
| JP | 51-89814 | 7/1993 |
| WO | WO 98/20635 | 5/1998 |

* cited by examiner

*Primary Examiner*—Duc Nguyen
*Assistant Examiner*—Zhiyu Lu
(74) *Attorney, Agent, or Firm*—Brundidge & Stanger, P.C.

(57) ABSTRACT

A multimode wireless communication apparatus including a radio frequency unit having controllable communication mode and a control unit for periodically making the radio frequency unit operate in a mobile telephone mode and, after predetermined time, switching the mode to a wireless LAN mode, wherein if occurrence of an incoming call event is detected when the radio frequency unit is in standby reception in the mobile telephone mode, the control unit suppresses the switching to the wireless LAN mode and determines whether the communication in the mobile telephone mode should be continued or not.

16 Claims, 9 Drawing Sheets

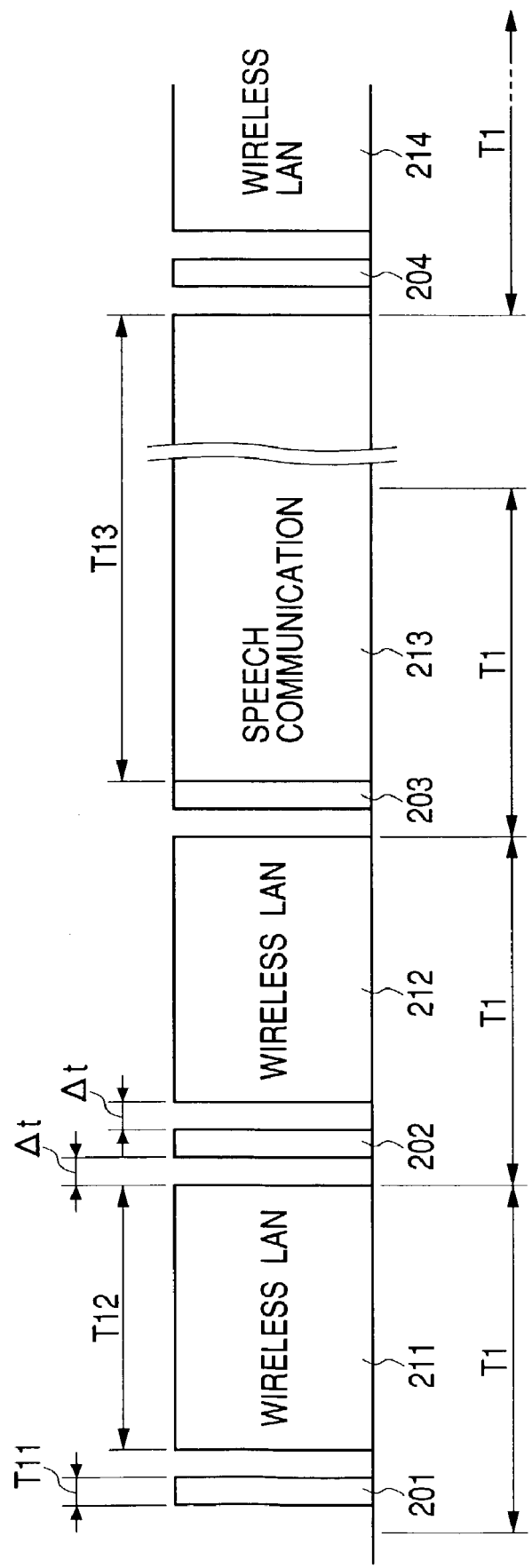

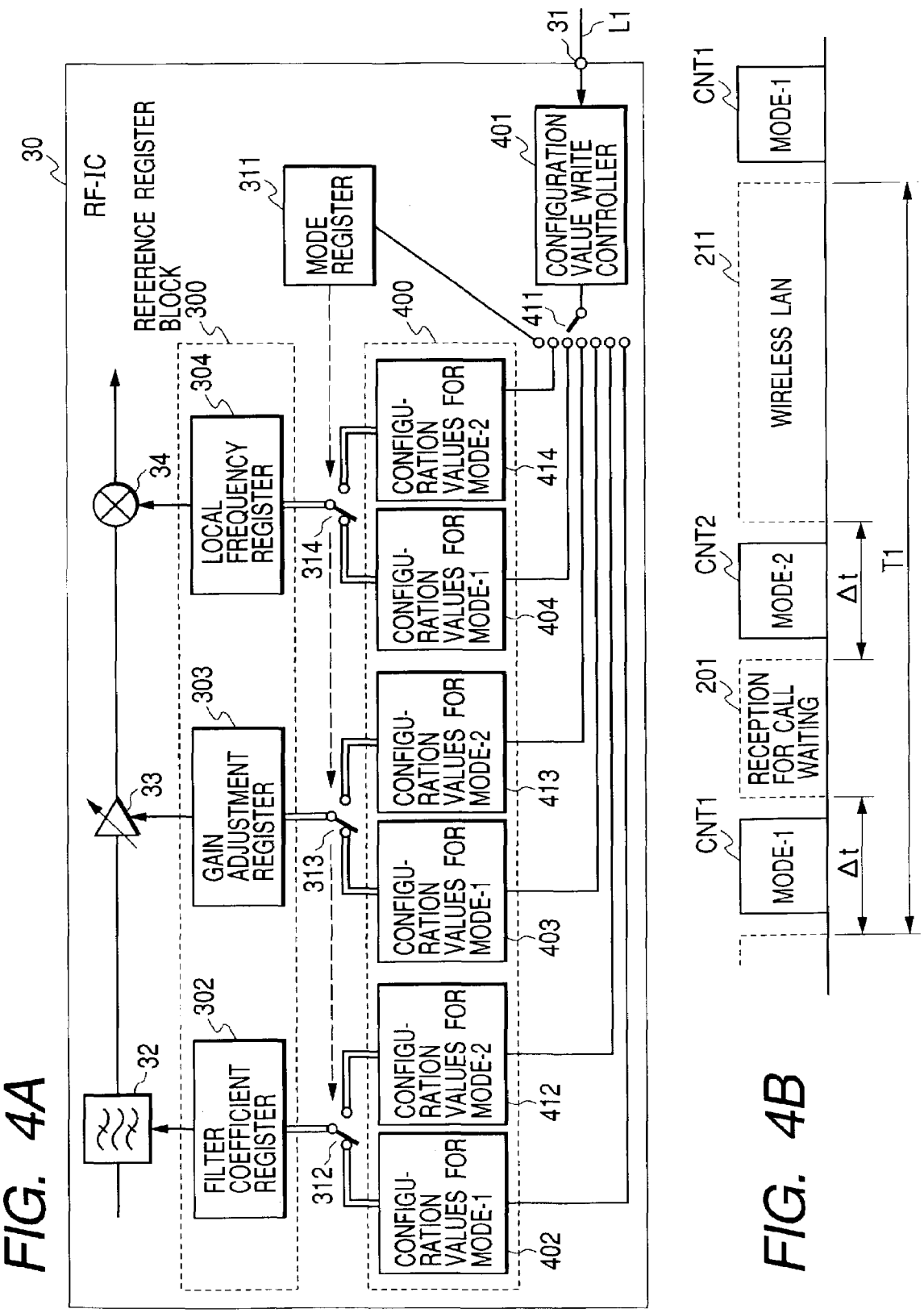

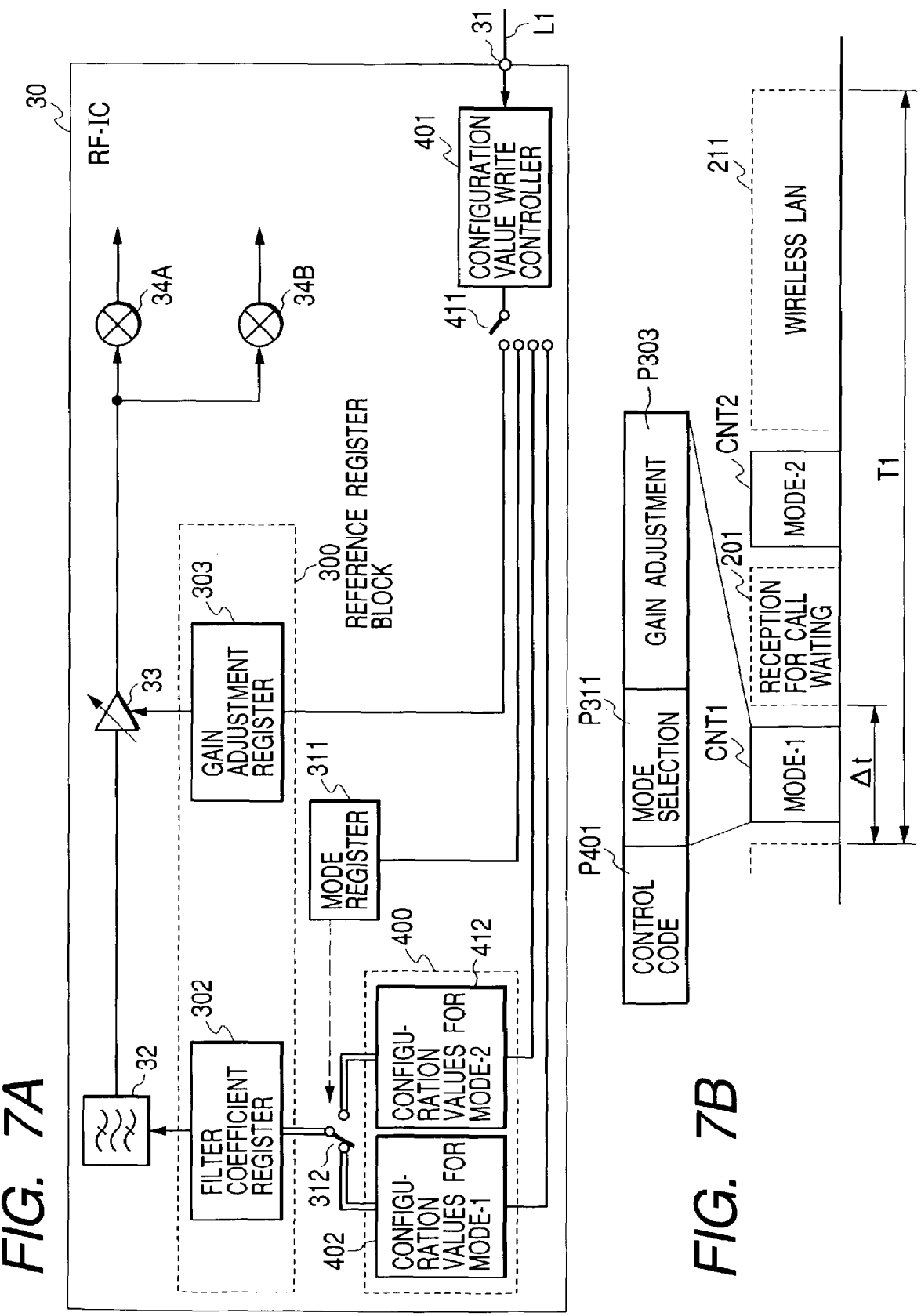

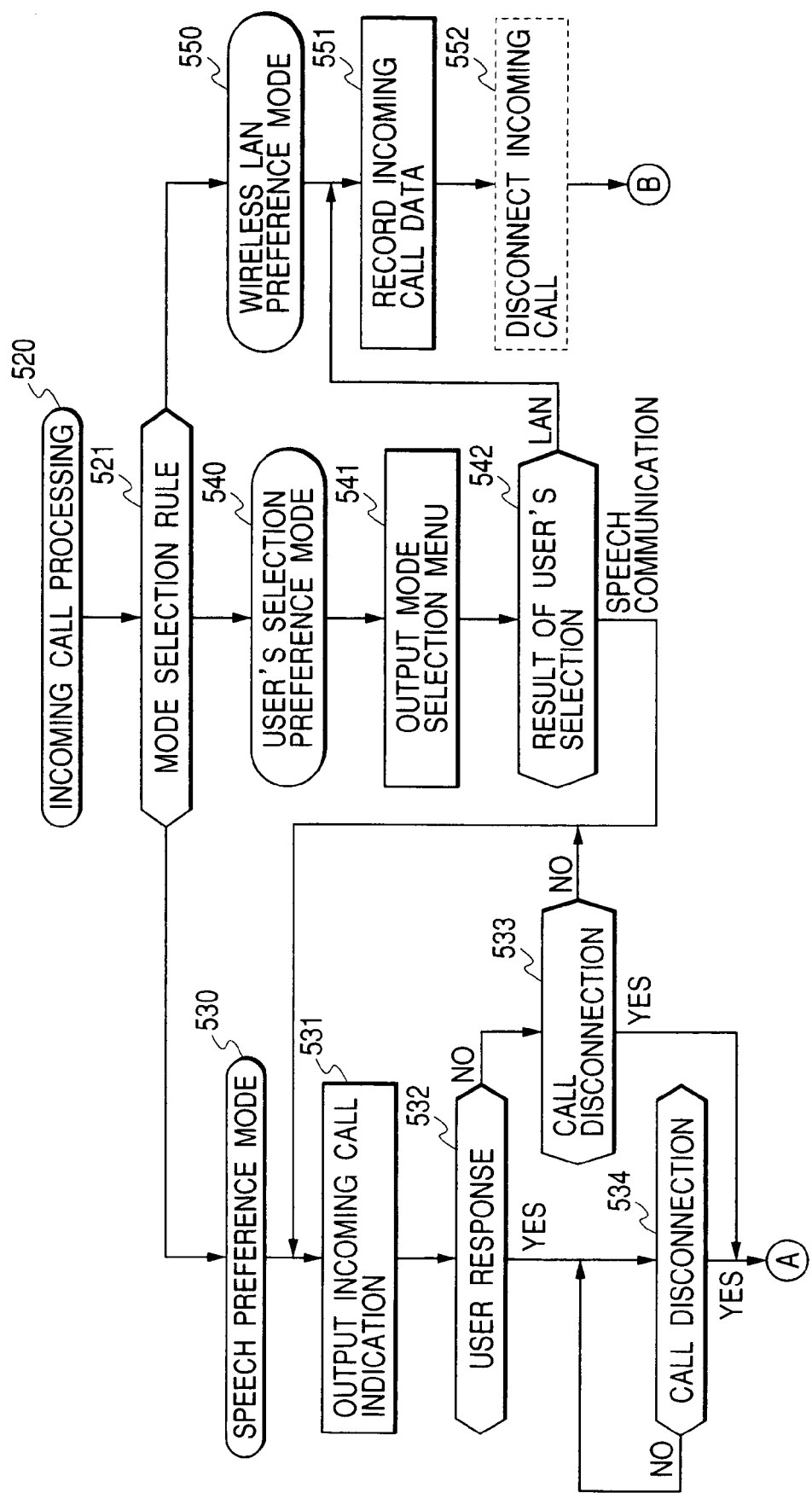

MULTIMODE WIRELESS COMMUNICATION APPARATUS AND HIGH FREQUENCY INTEGRATED CIRCUIT THEREFOR

BACKGROUND OF THE INVENTION (1) Field of the Invention

The present invention relates to a multimode wireless communication apparatus conformed with a plurality of communication standards and a high frequency integrated circuit therefor.

(2) Description of the Related Art

Communication modes (communication protocols) in wireless terminals are broadly divided into a wireless communication protocol for mobile telephone network such as GSM, EDGE, GPRS, PDC, cdmaOne, cdma2000, and W-CDMA each using a public network of a wide area (hereinafter, called public network wireless communication protocol), and a communication protocol for wireless LAN such as IEEE802.11a, 11b, 11g, and 11h and HiperLAN/2 using a local network. The wireless communication protocol using a local network also includes, for example, a short-range wireless communication protocol such as by Bluetooth or UWB.

In the specification, the local network wireless communication protocol includes the above short-range wireless communication protocol. A wireless terminal (wireless communication apparatus) having two communication modes, one for the public network wireless communication protocol and the other for local network wireless communication protocol will be called a multimode wireless terminal.

In the field of wireless communication, recently, a mobile telephone network having a wide service area is rapidly spreading. Meanwhile, in the metropolitan area, information service using a local high-speed network such as a wireless LAN has also started. Thus, various wireless communication systems coexist today. A mobile telephone terminal has advantages such that a communication area is wide and communication can be continued even when the user is moving among cells at high speed. However, the bit rate is as low as 9.6 to 384 kbits/second and the communication cost is expensive. On the other hand, at present, information service areas of a wireless LANs are limited to, for example, service areas called hot spots in the metropolitan area. Unlike mobile telephone systems, the wireless LAN cannot provide communication service to the user who is moving at high speed. However, as compared to a mobile telephone, the wireless LAN can provide a higher bit rate service (for example, 22 to 54 Mbps), its communication cost is overwhelmingly cheaper, and there exist a number of service areas which are free of communication charges.

Consequently, the demand for a multimode terminal adapted to a plurality of communication standards, so that both of the services can be received by a single wireless terminal is increasing. A multimode wireless terminal conventionally proposed has plural kinds of transceivers adapted to different communication protocols (communication modes), so that the user can selectively use one of communication modes or use two modes in parallel independently of each other.

SUMMARY OF THE INVENTION

As described above, the mobile telephone network and the wireless LAN have contradictory advantages and disadvantages. Consequently, it is considered to be more advantageous from the viewpoints of power consumption and communication costs of a wireless terminal to use the communication functions of a mobile telephone network and a wireless LAN while dynamically switching communication modes in accordance with the service area and user's purpose, than to use the communication functions independently of each other.

However, a conventional multimode terminal does not switch the communication modes at all or switching of the communication modes is up to the user. Therefore, the terminal functions are not efficiently used. A conventional multimode wireless terminal having a plurality of transceivers for respective communication modes has a problem of a large circuit scale. A terminal which shares a transceiver circuit for a plurality of communication modes has a problem that it takes time to switch the communication modes.

An object of the invention is to provide a multimode wireless communication apparatus capable of switching the communication mode at high speed.

Another object of the invention is to provide a multimode wireless communication apparatus having a radio frequency unit commonly used in a plurality of communication modes and capable of switching the communication mode at high speed.

Another object of the invention is to provide a multimode wireless communication apparatus capable of executing two communication modes in a time sharing manner.

Further another object of the invention is to provide a high frequency integrated circuit for a multimode wireless communication apparatus capable of switching the communication mode at high speed.

To achieve the above objects, a multimode wireless communication apparatus of the invention comprises: a radio frequency unit having controllable communication modes; and a control unit for making the radio frequency unit operate periodically in a first communication mode and, after predetermined time interval, switching the communication mode to a second communication mode, and the control unit includes determining means for suppressing the switching of the radio frequency unit to the second communication mode when occurrence of a predetermined event is detected from a signal received during a period in which the radio frequency unit is operating in the first communication mode and determining whether communication in the first communication mode should be continued or not.

More specifically, the radio frequency unit is comprised of a high frequency integrated circuit including at least one analog component having operation characteristic controllable with a reference parameter value, and the control unit switches the communication mode of the radio frequency unit by changing the reference parameter value for determining the operation characteristic of the high frequency integrated circuit.

According to an embodiment of the invention, the high frequency integrated circuit includes a reference register in which the reference parameter value for determining the operation characteristic of the analog component is set, a first register for storing a parameter value for the first communication mode, a second register for storing a parameter value for a second communication mode, and a switch for selectively supplying the parameter value stored in one of the first and second registers to the reference register, and the control unit switches the communication mode of the radio frequency unit by controlling the switch to change the reference parameter value set in the reference register.

A key feature of the invention resides in that the determining means determines whether the first communication mode should be continued or switched to the second communication mode in accordance with a predetermined mode selection rule.

In an embodiment of the invention, the above determining means has means to inquire a user which operation mode to select next in accordance with the mode selection rule, and selects either the first communication mode or the second communication mode in accordance with the instruction from the user. The radio frequency unit includes a transmission power amplifier connected to an on/off controllable power source, and the control unit turns off the power source for the transmission power amplifier before switching the operation mode of the radio frequency unit and, after the operation mode is switched, turns on the power source for the transmission power amplifier.

According to the invention, a high frequency integrated circuit for a multimode wireless communication apparatus including at least one analog component having operation characteristic controllable with a reference parameter value, comprises: a reference register in which the reference parameter value for determining the operation characteristic of the analog component is set; a first register for storing a first parameter value for a first communication mode; a second register for storing a second parameter value for a second communication mode; a switch for selectively connecting one of the first and second registers to the reference register so as to set the first parameter value or the second parameter value as the reference parameter value; a switch control circuit for controlling the switch in accordance with a mode selection signal supplied from an external signal line; and a write control circuit for writing a parameter for the first mode and a parameter for the second mode supplied from the external signal line to the first and second registers, respectively. The mode selection signal is supplied to the switch control circuit via the write control circuit.

The other objects and characteristic configurations of the invention will become apparent from description of embodiments with reference to the following drawings.

BRIEF DESCRIPTION OF THE DRAWINGS

FIG. 2 is a diagram showing an example of a sequence of switching a communication mode in the multimode wireless terminal of the invention.

FIG. 4A is a block diagram showing a first embodiment of an RF-IC control circuit for a multimode wireless terminal according to the invention.

FIG. 4B is a diagram for explaining a parameter setting sequence for switching the communication mode in the multimode wireless terminal of the first embodiment of the invention.

FIG. 7A is a block diagram showing a fourth embodiment of the RF-IC control circuit for the multimode wireless terminal according to the invention.

FIG. 7B is a diagram for explaining a parameter setting sequence for switching the communication mode in a multimode wireless terminal of the fourth embodiment of the invention.

FIG. 8B is a flowchart showing the details of incoming call processing 520 in FIG. 8A.

DESCRIPTION OF THE PREFERRED EMBODIMENTS

Figure 1:
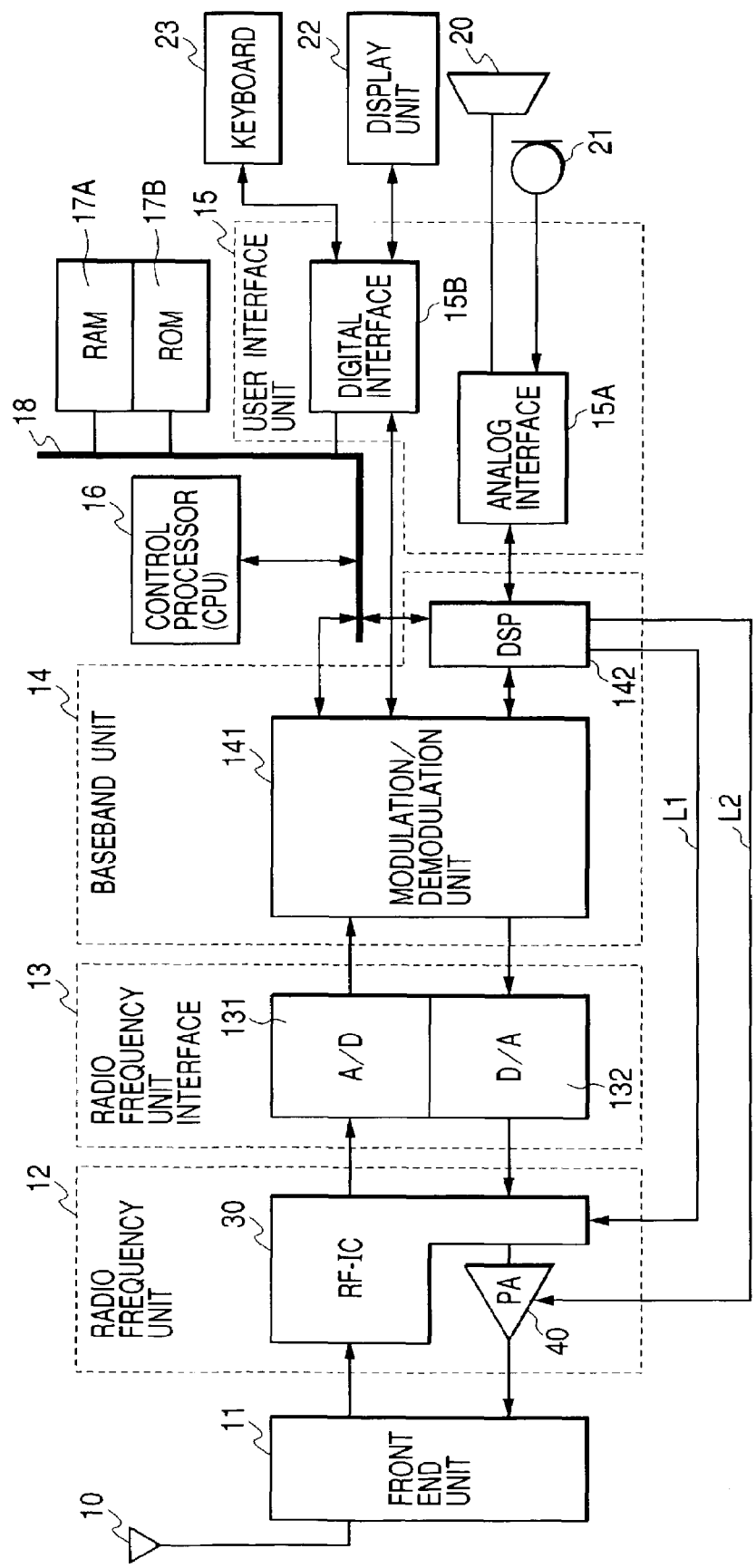
FIG. 1 is a diagram showing the configuration of a wireless communication apparatus (multimode wireless terminal) to which the invention is applied.

In a wireless communication system designed on the premise that a terminal performs communication while moving from cell to cell, such as a mobile telephone, in order to enable a wireless terminal (mobile terminal) to be located whenever a call is made for the terminal, each of the mobile terminals executes a communication protocol for registering its position to a base station which is reachable from its present position. Even when the user does not perform communication, each mobile terminal periodically receives a specific signal transmitted from a base station nearby, thereby monitoring the necessity to register its position to a new base station and the presence or absence of a call to the terminal itself. Such a signal receiving process is generally called standby reception. In order to increase available communication time of a mobile terminal by suppressing the consumption of its battery, the repeating cycle of the standby reception is set to be relatively long (about 1 second) and a protocol is determined so as to complete each standby receiving process in short time.

On the other hand, in a wireless communication system designed on the premise of using a local high-speed network such as a wireless LAN, there is no rule in the communication standard regarding an intermittent standby reception processing as performed in a mobile telephone terminal. Therefore, in order to make the user obtain information service from a wireless LAN while moving around, each wireless terminal has to periodically measure the signal intensity of a common channel in the wireless LAN and determine whether the terminal can communicate with the wireless LAN in the present position or not. A terminal once connected to the wireless LAN basically enters a receivable state, monitors data on the network, and receives the desired data.

The multimode wireless terminal of the invention is characterized in that, in order to enable communication in both communication modes of a mobile telephone terminal and a wireless LAN terminal, the operation mode of the terminal is automatically switched to a local network wireless communication mode (wireless LAN mode) at intervals of standby receptions periodically repeated in the mobile telephone mode.

FIG. 2 shows an example of a sequence of switching the communication mode in a multimode wireless terminal according to the invention.

According to the invention, as shown in FIG. 2, during intervals T12 (211, 212, . . . ) between intermittent standby receptions T11 (201, 202, . . . ) of a mobile telephone mode (public network wireless communication mode) repeated in predetermined cycles T1, the communication mode of the terminal is changed to the wireless LAN mode (local network wireless communication mode). The mobile telephone mode is one of, for example, GSM, PDC, EDGE, GPRS, cdmaOne, cdma2000, and W-CDMA, and the wireless LAN mode is one of, for example, IEEE802.11a, IEEE802.11b, IEEE802.11g, IEEE802.11h, HiperLAN/2, Bluetooth, and UWB.

If the terminal is located in an area where the wireless LAN can be used, by using the periods T12, a packet transmission and receiving processing via the wireless LAN is executed. At the time of switching the communication mode, there is the possibility that a transmission signal spectrum goes out of a restricted range (spectrum mask) defined by a wireless communication standard due to a transient response of a power amplifier or the like in a transmitter circuit. Consequently, as shown by Δt in FIG. 2, switching of the communication mode is executed after the power source for a transmission power amplifier is turned off once.

In the case where there is an incoming call during the standby reception period T11 of the mobile telephone mode, the incoming call is treated in accordance with a mode selection rule designated by the user in advance. For example, when a mobile telephone preference mode is designated as the mode selection rule, the mobile telephone mode is continued, as shown by a period T13 in FIG. 2, even after a standby reception period 203 in which an incoming call is detected, and communication via the wireless LAN is interrupted until speech communication is finished.

If a wireless LAN preference mode is designated as the mode selection rule, an incoming call is ignored and, after the standby reception period 203, communication in the wireless LAN mode in the period T12 is repeated. The communication mode after the incoming call may be selected according to the choice of the user each time an incoming call is detected. Specifically, when a user selection mode is designated as the mode selection rule, automatic switching to the wireless LAN mode is stopped, the user is requested to select a communication mode on which priority is to be placed, and the operation mode is switched to a communication mode designated by the user.

FIG. 1 is a configuration diagram showing an example of a multimode wireless terminal to which the mode switching shown in FIG. 2 is applied.

The multimode wireless terminal is comprised of: a front end unit 11 connected to an antenna 10; a radio frequency unit 12 connected to the front end unit 11; a radio frequency unit interface 13 including an analog to digital (A/D) converter 131 and a digital to analog (D/A) converter 132; a baseband unit 14 including a modulation and demodulation unit (modem) 141 and a digital signal processor (DSP) 142; a control processor (CPU) 16 connected to the DSP 142 via an internal bus 18; a user interface 15; and a random access memory (RAM) 17A and a read only memory (ROM) or flash memory 17B connected to the internal bus 18. The switching of the communication mode of the terminal is conducted by the control processor 16 in cooperation with the DSP 142.

The radio frequency unit 12 includes at least a radio frequency integrated circuit (RF-IC) 30 subjected to mode switching control which will be described later and a transmission power amplifier (PA) 40. The user interface 15 is comprised of an analog interface 15A connected to the DSP 142 and a digital (data) interface 15B connected to the internal bus 18 and the modem 141. The analog interface 15A is coupled with a speaker 20 and a microphone 21. A display unit 22 and a keyboard 23 are coupled with the digital interface 15B.

A received signal from the antenna 10 is input to the front end unit 11, separated from a transmission signal by an antenna switch (or duplexer) and filtered. After that, the resultant signal is input to the radio frequency unit 12. The RF-IC 30 of the radio frequency unit 12 has circuit functions of a filter, an amplifier, a mixer, and the like and the received signal is converted to a base band signal by the RF-IC 30. The base band signal output from the RF-IC 30 is converted to a digital signal by the A/D converter 131 in the interface 13 and the digital signal is demodulated by the modem 141 in the baseband unit 14. When a demodulated signal is a voice signal, it is processed by the DSP 142 and the processed signal is output to the analog interface 15A. In the case where the demodulated signal is data, the data is output to the digital interface 15B or internal bus 18.

The transmission voice signal input from the microphone 21 and the transmission data output from the control processor 16 are subjected to a process such as error correction coding or the like by the DSP 142. The resultant signal is modulated by the modem 141. The modulated transmission signal is converted to an analog signal by the D/A converter 132 and, after that, the analog signal is converted to a radio frequency transmission signal in a desired frequency band by the RF-IC 30 in the radio frequency unit 12. The radio frequency transmission signal is amplified by the power amplifier 40 and filtered by the front end unit 11. After that, the resultant signal is transmitted from the antenna 10.

The control processor (CPU) 16 executes various programs for data processing or communication control in response to the user operation from the keyboard 23 The control processor 16 also executes a communication mode switching control routine which will be described later and performs setting of various parameters to the RF-IC 30 and a mode switching via the DSP 142. The setting of parameters and the mode switching are instructed to the RF-IC 30 via a signal line L1. Turn-on/off of the power source for the transmission power amplifier 40 is instructed via a signal line L2.

Figure 3A:
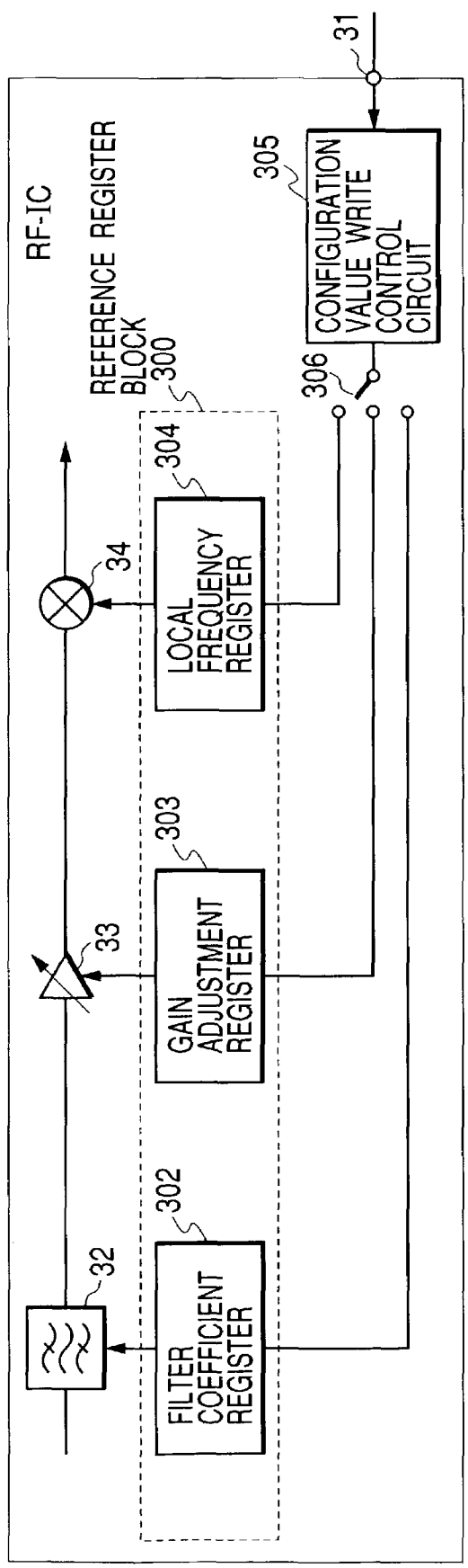
FIG. 3A is a configuration diagram showing an example of a conventional RF-IC control circuit for a multimode wireless terminal.

FIG. 3A shows main components of a control circuit of a conventional RF-IC for a multimode wireless terminal. For simpler explanation, the diagram shows, as components of the RF-IC, a filter 32, a variable gain amplifier 33, and a mixer 34 which construct a receiving circuit and, in correspondence with the above components, a plurality of reference registers (a filter coefficient register 302, a gain adjustment register 303, and a local frequency register 304) which are formed in a reference register block 300. In an actual RF-IC, the receiving circuit includes other analog components in addition to the above components. On the substrate of the RF-IC, not only the above receiving circuit but also a transmission circuit having an operation characteristic controllable with reference parameter values is formed.

In the multimode wireless terminal, as shown in FIG. 3A, by employing a circuit configuration in which the operation characteristics of some of the analog components formed on the RF-IC are changed depending on the value of reference parameters set in the reference register block 300, a plurality of different communication modes are realized by a single RF-IC. Reference parameters to be set in the reference register block 300 vary according to the kind of analog components. For example, the parameter for a mixer which is set in the reference register 304 indicates the frequency of a local signal to be supplied to the mixer. The parameter for the variable gain amplifier set in the reference register 303 indicates a gain coefficient of an amplifier. The parameter for a filter set in the, reference register 302 indicates a filter coefficient.

Each of reference parameter may be comprised of a multi-bit parameter in which each bit designates the potential of one of terminals of an analog component. For example, "0" bit corresponds to GND potential and "1" bit corresponds to Vdd. In the case of correcting the characteristic of a nonlinear component such as the power amplifier by predistortion or the like, the parameter to be set in the reference register may also include a calibration correction value.

In the conventional RF-IC, these reference parameters are supplied from an external signal input pin 31 to a configuration value write control circuit 305. By switching a switch 306 by the configuration value write control circuit 305, the parameters are selectively set into the specific registers 302 to 304 in the reference register block 300. Each of the analog components such as the filter 32, variable gain amplifier 33, and mixer 34 operates with an operation characteristic depending on the reference parameter value indicated by the corresponding reference register.

The external signal line used for setting the above parameters into the reference registers is generally of a serial bus type for sequentially transferring data bit by bit, in order to realize smaller size of an IC package by reducing the number of external signal pins of the RF-IC as much as possible.

Figure 3B:
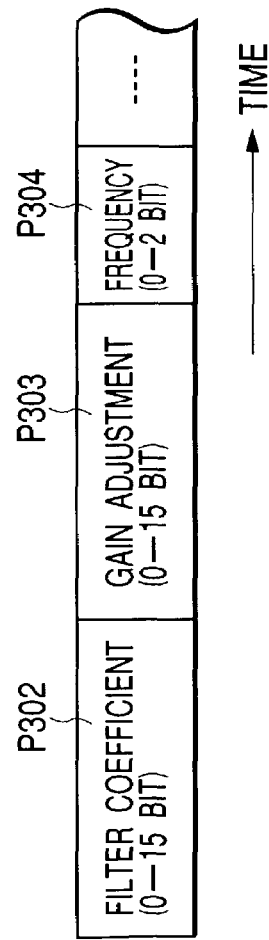
FIG. 3B is a diagram for explaining a parameter setting sequence for switching the communication mode in a conventional RF-IC.

In a conventional multimode wireless terminal, switching of the operation mode of the RF-IC is realized by changing the reference parameters in response to a user operation. In this case, each time the mode is switched, for example, as shown in FIG. 3B, all of parameters P302, P303, P304, . . . to be set in the reference register block 300 have to be supplied serially from the external signal input pin 31. Consequently, hundreds of clocks is required to switch the mode.

The conventional RF-IC is adopted on a premise that the mode switching is of low frequency such that one communication mode selected by the user continues for several minutes or longer. In this case, if the user sets the terminal in the wireless LAN mode, the terminal loses the function of a mobile telephone. Therefore, as long as the user does not switch the operation mode of the terminal to the mobile telephone mode by re-setting the reference parameters, standby reception of the mobile telephone is not executed.

FIG. 4A shows a first embodiment of the control circuit of the RF-IC 30 for a multimode wireless terminal according to the invention.

As described by referring to FIG. 2, in order to frequently switch the communication mode of the multimode wireless terminal in relatively short cycles, the values of various reference parameters set in the reference register block 300 of the RF-IC 30 have to be changed at high speed.

When all of the reference parameters are input from the external signal input pin 31 each time the mode is switched as in the conventional technique, overhead for setting the parameters increases and, as a result, the operation period in the wireless LAN mode has to be shortened.

For example, when it is assumed that the reference register block 300 of the RF-IC 30 has 24 registers each having a 16-bit width, in order to set parameters from the serial bus (signal line L1), 384 (=16×24) clocks are necessary. If the operation clock of the RF-IC 30 is 15 MHz, it takes about 25 msec for the parameter setting. Therefore, if the standby reception processing is repeated at the intervals of one second, there is a problem such that half of the period T1 shown in FIG. 2 would be consumed for the parameter setting for the mode switching.

To reduce the overhead of the parameter setting to the reference register block 300 which occurs at the time of switching the communication mode, in the first embodiment of the invention, the RF-IC 30 is provided with a parameter storing register block 400. When the power source of the terminal is turned on, configuration parameter values to be used as reference parameters for respective communication modes are supplied from the signal line L1 and stored in the register block 400. Each time the switching of the communication mode is required, the configuration parameter values of a desired mode are transferred from the register block 400 to the reference register block 300 in parallel.

For example, when a mobile telephone is defined as a mode 1 and the wireless LAN is defined as a mode 2, parameter storing registers 402 to 404 for the mode 1 and parameter storing registers 412 to 414 for the mode 2 are prepared in the parameter storing register block 400, in correspondence with the registers 302 to 304 in the reference register block 300. The configuration parameter bits stored in one of the registers 402 and 412 are selectively transferred in parallel to the register 302 via a mode switch 312 in accordance with the communication mode. Similarly, configuration parameter bits stored in one of the registers 403 and 413 are selectively transferred in parallel to the register 303 via a mode switch 313, and configuration parameter bits stored in one of the registers 404 and 414 are selectively transferred in parallel to the register 304 via a mode switch 314.

The mode switches 312 to 314 connect either the group of parameter storing registers 402 to 404 for the mode 1 or the group of the parameter storing registers 412 to 414 for the mode 2 to the group of the registers 302 to 304.

With the configuration, for example, when the terminal power is turned on, various configuration parameters are supplied to the RF-IC in the form described by referring to FIG. 3B and the parameters for the modes 1 and 2 are set in the parameter storing registers 402 to 404 and parameter storing registers 412 to 414, respectively. After that, only by changing the set value (mode selection bit) in the mode register 311, the reference parameter values in the parameter reference registers 302 to 304 can be instantaneously changed.

The location of the register area to which the configuration parameter is to be written can be designated by, for example, a control code output to the signal line L1 from the DSP 142 prior to the parameter itself. Therefore, a configuration value write controller 401 can control a switch 411 in accordance with the control code received from the signal line L1, so that the parameter values received from the signal line L1 are selectively set in the registers in the parameter storing register block 400. By setting a mode selection bit received thereafter from the signal line L1 to the mode register 311, it is able to operate the switches 312 to 314 so as to change the reference parameter values, thereby switching the communication mode of the RF-IC 30 at high speed.

According to the embodiment, initial setting of configuration parameters in the parameter storing register block 400 takes relatively long time. However, in order to switch the communication mode of the RF-IC 30, for example, as shown by CNT1 and CNT2 in FIG. 4B, it is sufficient to supply short control data including a mode selection bit to the RF-CI 30. Consequently, the switching of the operation mode can be completed in short time Δt equivalent to only a few clocks.

Figure 8A:
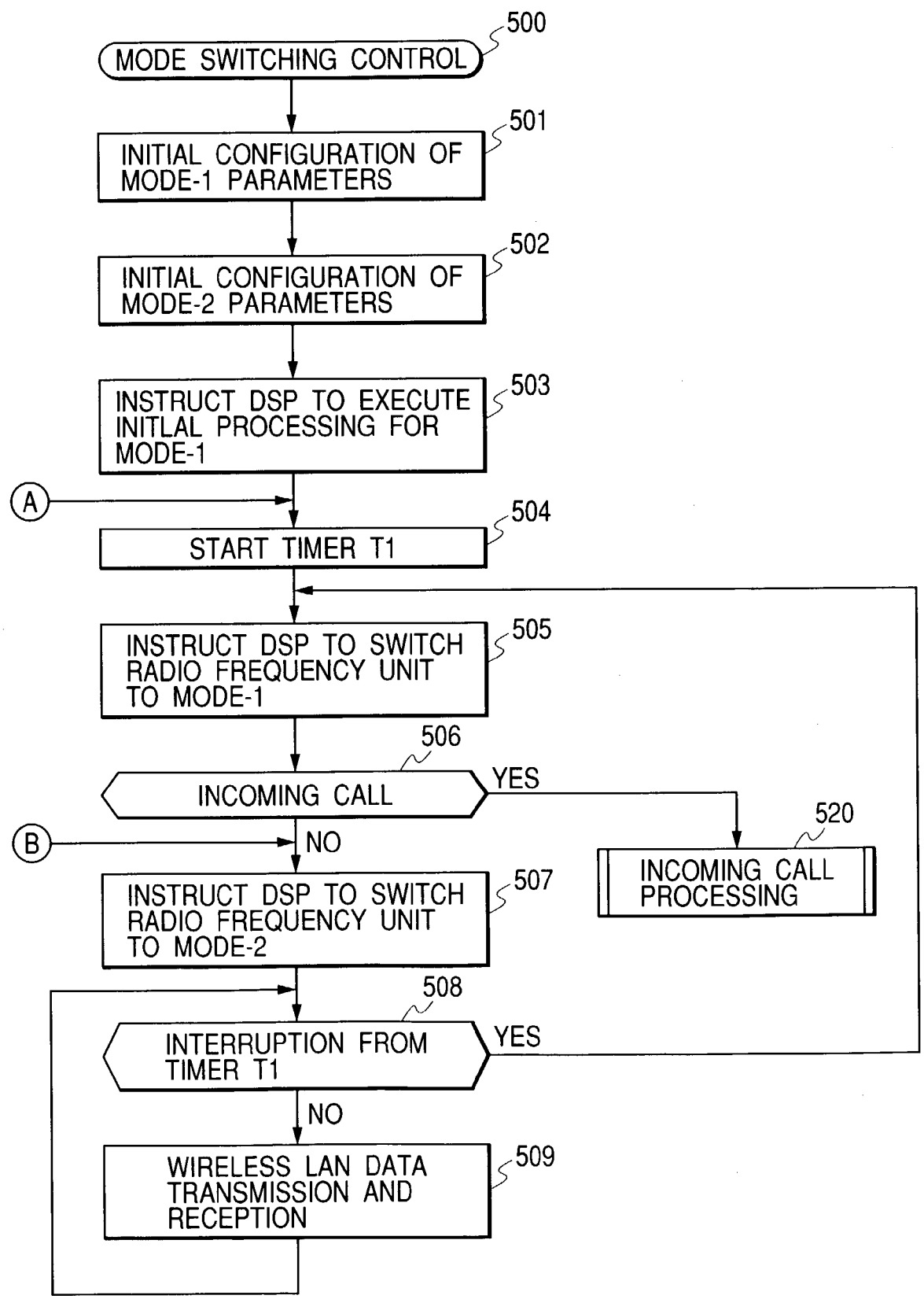
FIG. 8A is a flowchart showing a mode switching control routine executed by a control processor 16 in FIG. 1 in the multimode wireless terminal of the first embodiment of the invention.

FIGS. 8A and 8B show flowcharts of a mode switching control routine 500 corresponding to the first embodiment. The control routine 500 is executed by the control processor (CPU) 16 when the power of the terminal is turned on.

The control processor 16 executing the mode switching control routine 500 sets, first, the configuration parameters for the mode 1 into the parameter storing registers 402 to 404 on the RF-IC 30 via the DSP 142 (step 501). Various parameter values required for the configuration parameters for the mode 1 and mode 2 are stored in advance in a parameter table in the ROM 17B. Therefore, when the control processor 16 transmits the configuration parameters for the mode 1 read out from the ROM together with the write control command to the DSP 142, the DSP 142 transfers the received parameters together with a control code for the write control circuit 401 to the signal line L1, and the write control circuit 401 in the RF-IC 30 selectively writes the parameters received from the signal line L1 to the registers 402 to 404 specified by the control code. Like in step 501, the control processor 16 sets the configuration parameters for the mode 2 to the parameter storing registers 412 to 414 in the RF-IC 30 in cooperation with the DSP 142 (step 502)

After the parameter initial setting, the control processor 16 instructs the DSP 142 to execute the initial processing in the mode 1 (mobile telephone mode) (step 503). In response to the instruction, the DSP outputs to the signal line L1 an instruction of switching the communication mode to the mode 1 and executes a predetermined communication procedure for registering the terminal position to a base station of the mobile telephone network. The instruction of switching the communication mode to the mode 1 output to the signal line L1 includes a mode selection bit indicative of switching to the mode 1 and a control code indicating that the destination of the mode selection code is the mode register 311.

On completion of registration of the terminal position, the control processor 16 starts a timer T1 (step 504) and instructs the DSP 142 to switch the radio frequency unit to the mode 1 (step 505). Upon receiving the mode switching instruction from the control processor 16, the DSP 142 once turns off the power source of the transmission power amplifier 40 via the signal line L2, outputs an instruction of switching to the mode 1 to the signal line L1, and returns the power source of the transmission power amplifier 40 to the on state. By the operation, standby reception of predetermined time T11 is started. By monitoring a signal output from the modem 141 to the internal bus 18 during the standby reception period T11, the control processor 16 determines whether an incoming call event occurs or not (step 506).

If there is an incoming call in the mode 1, the control processor 16 executes an incoming call processing 520 shown in FIG. 8B. If there is no incoming call during the standby reception period T11, the control processor 16 instructs the DSP 142 to switch the radio frequency unit to the mode 2 (wireless LAN mode) (step 507).

When the switching instruction to the mode 2 is received from the control processor 16, the DSP 142 turns off the power source of the transmission power amplifier 40 via the signal line L2, outputs a switching instruction to switch the operation mode of the radio frequency unit to the mode 2 to the signal line L1, and returns the power source of the transmission power amplifier 40 to the on state. The switching instruction to the mode 2 includes the mode selection bit indicative of switching to the mode 2 and a control code indicating that destination of the mode selection bit is the mode register 311.

After switching the RF-IC 30 to the mode 2, the control processor 16 executes the data transmission and receiving processing for the wireless LAN until interruption of the timer T1 occurs (step 509). When interruption of the timer T1 occurs (step 508), the control processor 16 returns to step 505 and instructs the DSP 142 to switch the RI-IC 30 to the mode 1.

By the control procedure, as long as there is no incoming call to the terminal, the data transmission and receiving processing for the wireless LAN can be executed at the intervals of the standby reception periods. That is, the incoming call standby reception processing in the mode 1 and the data transmission and receiving processing for the wireless LAN in the mode 2 are executed in a time sharing manner.

In the incoming call processing 520, as shown in FIG. 8B, the mode selection rule designated by the user in advance is judged (step 521). When a speech preference mode is designated as the mode selection rule (step 530), the control processor 16 executes an output processing for indicating the incoming call (step 531). The incoming call is notified to the user, for example, by outputting flashing display indicative of an incoming call on the display unit 22 or outputting a melody indicative of an incoming call to the speaker 20. The control processor 16 waits for a response from the user to the incoming call (step 532). If there is no response, the control processor 16 repeats the incoming call indication 531 until the calling party disconnects the call (step 533).

When the user performs an input operation to respond to the incoming call, the wireless terminal enters a speech mode in which voice signals are communicated via the DSP. The control processor 16 monitors disconnection of the call in this state (step 534). When the call is disconnected, the control processor 16 returns to step 504 in FIG. 8A, restarts the timer T1, and repeats the steps 505 to 509.

When a wireless LAN preference mode is designated as a mode selection rule (step 550), the control processor 16 records incoming call data such as incoming call time and telephone number of the caller into the RAM 17A (step 551), disconnects the call (step 522), and returns to step 507 in FIG. 8A. In this case, the incoming call is ignored and, by using the intervals between the call standby reception periods, the data transmission and receiving processing for the wireless LAN is intermittently executed. It is also possible to omit the disconnection of the call (step 522) and allow the caller to disconnect the call.

When a user's selection preference mode is designated as a mode selection rule (step 540), the control processor 16 outputs a menu screen (or icon) for mode selection on the display unit 22 (step 541) and treats the incoming call in accordance with the communication mode selected by the user on the menu screen. If the user selects the speech preference mode, steps 531 to 534 are executed. If the user selects the wireless LAN preference mode, steps 551 and 552 are executed.

In the first embodiment described above, the multimode terminal capable of switching between two kinds of communication modes has been described. There is, however, a case that selectable three or more kinds of communication modes are desired to be offered, depending on a service area where the wireless terminal exists. If a frequent mode switching occurs among all of communication modes, a number of registers equal to the number of kinds of communication modes have to be prepared in the parameter storing register block 400 in correspondence with registers in the reference register block 300. In this case, the number of parameter storing registers and the circuit scale of the RF-IC 30 increases. In order to reduce the circuit scale of the RF-IC 30, for example, it is sufficient to make specific groups of configuration parameters always reside in the parameter storing register block 400 with respect to communication modes which are frequently switched, and to supply the other configuration parameters with respect to a communication mode having relatively long switching intervals from the ROM 17B to the parameter storing register block 400 each time the communication mode is selected.

Figure 5:
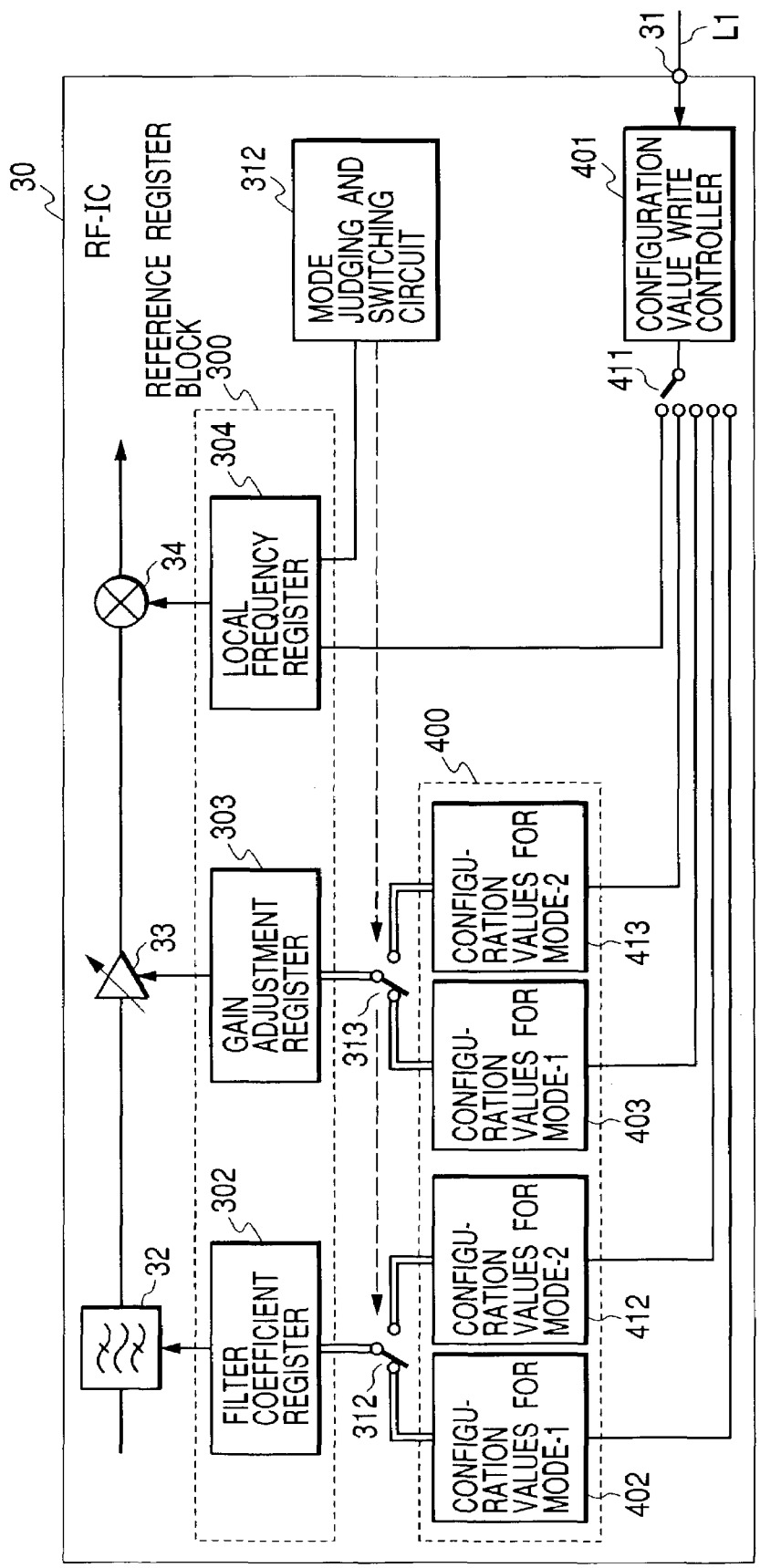
FIG. 5 is a block diagram showing a second embodiment of the RF-IC control circuit for the multimode wireless terminal according to the invention.

FIG. 5 shows a second embodiment of the control circuit of the RF-IC 30 for the multimode wireless terminal according to the invention.

For example, in a wireless terminal of a carrier frequency hopping type, which selects a frequency to be used from a group of carrier frequencies according to a predetermined sequence different for each user terminal to perform communications while periodically switching the carrier frequency, the local frequency to be set in a mixer has to be changed for every call. When the carrier frequency hopping is employed as the mobile telephone mode (mode 1) reference parameters to be set in the local frequency configuration register 304 in the RF-IC 30 have to be updated for each call. In this case, it is not sufficient to switch the parameter storing registers like the first embodiment.

The second embodiment is directed to shorten the time required to change the reference parameters under such conditions. In the second embodiment, for the local frequency configuration register 304, reference parameters are set from the DSP via the signal line L1 and the state of the register 304 is monitored by the mode judging and switching circuit 312. For the other reference registers (302 and 303) in the reference register block 300, the mode judging and switching circuit 312 changes the reference parameters by switching the status of the switches 312 and 313 at a predetermined timing. Selection of a communication mode is performed based on the value of at least a part of parameters set in the register 304.

According to the embodiment, parameter data to be supplied from the external signal input pin 31 at the time of operation mode switching is only a parameter value for local frequency, so that the communication mode can be switched at higher speed as compared with the prior art.

Figure 6:
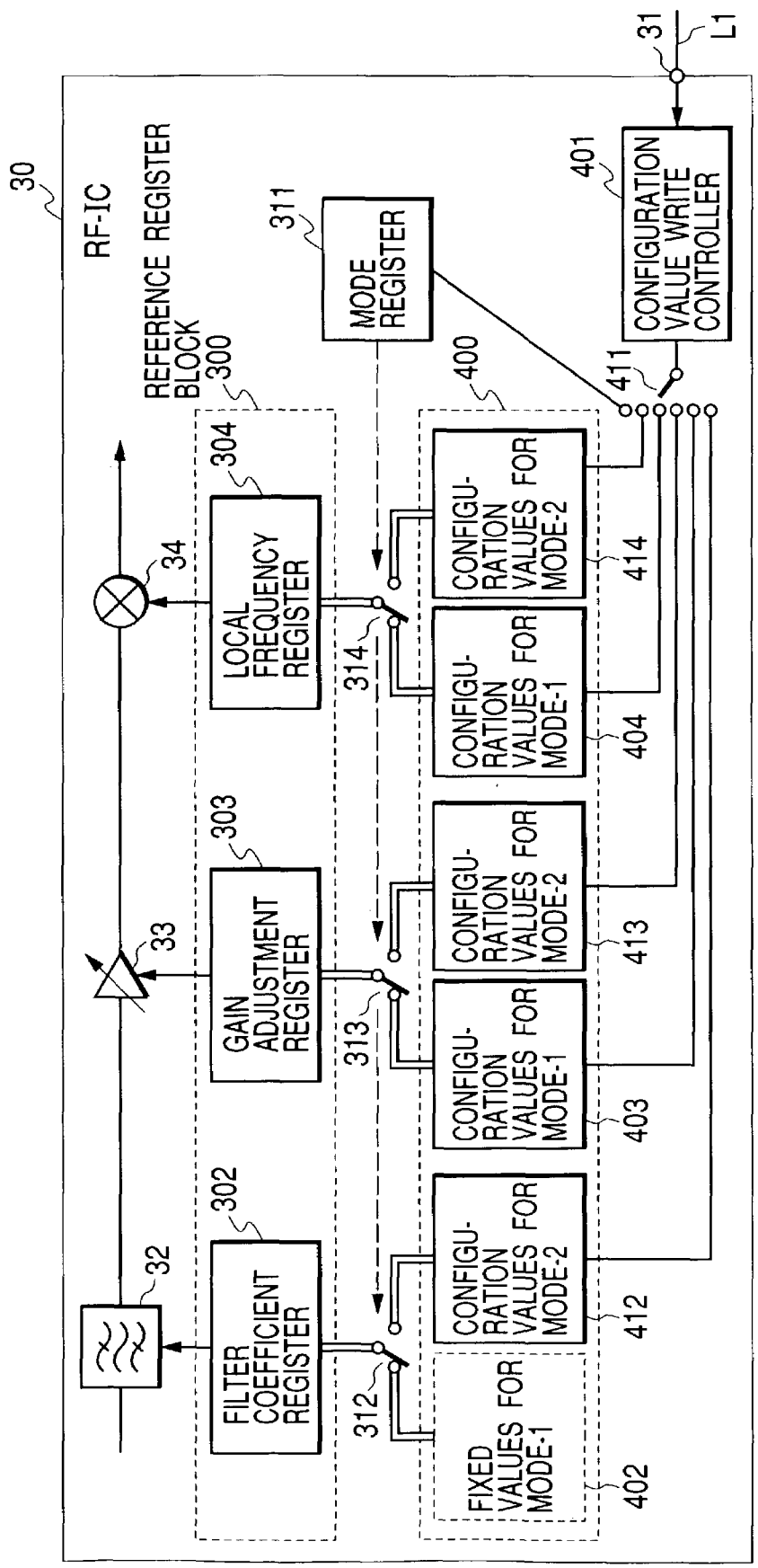
FIG. 6 is a block diagram showing a third embodiment of the RF-IC control circuit for the multimode wireless terminal according to the invention.

FIG. 6 shows a third embodiment of the control circuit in the RF-IC 30 for the multimode wireless terminal according to the invention.

In the first and second embodiments, configuration parameters are loaded from the external input pin 31 via the configuration value write controller 401 to all of registers prepared in the parameter storing register block 400 at the time of initial setting. However, depending on the wireless communication method, some parameters to be set in the RF-IC are unconditionally determined and will not be changed later. For example, in W-CDMA as a third generation mobile telephone, the frequency characteristics of the output signal are specified by a standard.

Consequently, an FIR filter coefficient on the output signal side decided at the time of circuit design will not be changed later. In such a case, it is unnecessary to write the same parameter values into the parameter storing register each time the initial setting is performed. For example, like in the register 402 in FIG. 6, a register as a part of the parameter storing register block 400 may be replaced with a ROM for holding fixed parameters. When the filter coefficient for the mode 2 is also a fixed value, the register 412 can be also replaced with a ROM. By replacing a part of the register area 400 with a ROM as described above, it is able to shorten the time required for parameter initial setting and to reduce power consumption.

FIG. 7A shows a fourth embodiment of the control circuit of the RF-IC 30 for the multimode wireless terminal according to the invention.

In the first embodiment, configuration parameter values are transferred as reference parameter values from the parameter storing register block 400 to all of the parameter reference registers (302 to 304). In an actual application, there is a case such that configuration parameters have to be set from the parameter storing register block 400 with respect to only a part of the reference registers.

The fourth embodiment is characterized in that, for example, like an amplifier gain parameter, a specific parameter of which set value is desired to be changed even in the same communication mode depending on special situations such as a radio propagation state in a wireless path is supplied from the external signal input pin 31 to the parameter reference register 303, and the other parameters are set from the parameter storing register block 400 to the parameter reference register.

In the embodiment, for example, special parts such as mixers 34A and 34B, which become difficult to share the same circuit depending on a combination of selectable communication modes or analog components to be dedicated to respective modes because it is advantageous from the view point of performance and power consumption, are excluded from targets of parameter switching. For some parts of which parameter set values are the same even when the communication mode changes, it is naturally unnecessary to switch the configuration parameters.

In the embodiment, as shown in FIG. 7B, it is sufficient to supply control data CNT1 and CNT2 including, for example, a control code P401, a mode selection bit P311, and an amplifier gain adjustment parameter P303 to the RF-IC 30 each time the communication mode is switched.

As described above, according to the invention, by properly combining parameter transfers from the holding register to the reference register in balance in accordance with the required performance of an analog component, the time required to switch the communication mode can be shortened while suppressing increase in the scale of the IC and the influence on performance.

In the embodiment shown in FIG. 8B, any one of the speech preference mode, wireless LAN preference mode, and user's selection preference mode is designated according to the mode selection rule in the incoming call processing. However, further another mode may be designated according to the mode selection rule. For example, a parallel execution mode of executing voice communication by a mobile telephone and data communication by a wireless LAN in parallel in a time sharing manner may be designated.

Since voice data is transmitted and received every 125 μsec, data of the wireless LAN can be communicated in a time sharing manner by using the intervals of voice data communication in the parallel execution mode. According to the invention, since the communication mode can be switched at high speed, for example, by increasing the operation speed of the RF-IC 30, control processor 16, and DSP 142 or decreasing the data bit rate of the wireless LAN in the parallel execution mode, it is able to offer such a form of communication service that the user is allowed to perform speech communication by a mobile telephone in parallel with display of received data from the wireless LAN to the display unit 22.

As obvious from the foregoing embodiments, according to the invention, the communication mode can be switched at high speed. Consequently, it is able to provide a multimode wireless terminal capable of executing plural kinds of communication modes of different communication protocols, like the mobile telephone and the wireless LAN communication, while periodically switching the communication modes.

In the embodiments, the multimode terminal for switching the communication mode between the mobile telephone mode (public network wireless communication) and the wireless LAN mode (local network communication) has been described. The method of switching the communication mode according to the invention is also applicable to a combination of communication modes other than the embodiments. For example, alternate switching may be performed between first and second communication modes of the wireless LAN in order to detect a wireless LAN system from which the terminal can receive data, so that a user can enjoy information distribution service provided by the detected wireless LAN system.

What is claimed is:

1. A multimode wireless communication apparatus comprising:
    a radio frequency unit having controllable communication mode; and
    a control unit for making said radio frequency unit operate periodically in a first communication mode for which said multimode wireless communication apparatus is already registered to a base station to monitor for presence of a call to said multimode wireless communication apparatus, and after a predetermined time interval, switching automatically from the first communication mode to a second communication mode different in communication protocol from the first communication mode,
    wherein said control unit includes communication mode determining means for selecting a communication mode based on a mode selection rule designated in advance by a user of the multimode wireless communication apparatus when a call to said multimode wireless communication apparatus is detected from a signal received during a period in which said radio frequency unit is operating in the first communication mode, thereby suppressing the switching of said radio frequency unit to the second communication mode if the mode selection rule indicates the first communication mode as a preference mode, switching said radio frequency unit to the second communication mode automatically if the mode selection rule indicates the second communication mode as a preference mode, and determining whether communication in the first communication mode should be continued on or not in accordance with an instruction from the user if the mode selection rule indicates a user selection preference mode,
    wherein said radio frequency unit is comprised of a high frequency integrated circuit, said high frequency integrated circuit comprising:
    a set of analog components that share in processing analog communication signals in both of said first and second communication modes;
    a plurality of reference registers, each of the reference registers storing a reference parameter with which an operation characteristic of a specified one of said analog components is determined;
    at least one first register associated with a specified one of said reference registers, wherein said at least one first register stores plural bits of a parameter value to be supplied to said specified one of said reference registers during the first communication mode;
    at least one second register paired with said first register, wherein said at least one second register stores plural bits of a parameter value to be supplied to said specified one of said reference registers during the second communication mode; and
    at least one switch that selectively supplies the parameter value stored in each of said first and second registers to the reference register in bit parallel, and
    wherein said control unit switches the communication mode of said radio frequency unit by controlling said switch so as to change the reference parameter values to be stored in said specified one of said reference registers, whereby said high frequency integrated circuit has an operation characteristic matched with the switched communication mode.

2. The multimode wireless communication apparatus according to claim 1, wherein said high frequency integrated circuit includes, in association with each of said reference registers, a pair of said first register for storing a parameter value for the first communication mode and said second register for storing a parameter value for the second communication mode, and said switch prepared for each pair of said first and second registers, and said control unit switches the communication mode of said radio frequency unit by controlling said switches so as to change the parameter value to be stored in each of said reference registers.

3. The multimode wireless communication apparatus according to claim 1, wherein said determining means determines whether said first communication mode should be continued or switched to said second communication mode in accordance with a predetermined mode selection rule.

4. The multimode wireless communication apparatus according to claim 3, wherein said determining means has means to inquire a user which operation mode to select next in accordance with said mode selection rule, and selects either said first communication mode or said second communication mode in accordance with an instruction from the user.

5. The multimode wireless communication apparatus according to claim 1, wherein said radio frequency unit includes a transmission power amplifier connected to an on/off controllable power source, and said control unit turns off the power source of said transmission power amplifier before switching the operation mode of said radio frequency unit, and after the operation mode switching, turns on the power source of said transmission power amplifier.

6. A high frequency integrated circuit for a multimode wireless communication apparatus, said high frequency integrated circuit comprising:
    a set of analog components that share in processing analog communication signals in both of a first communication mode and a second communication mode different in communication protocol from the first communication mode, each of said analog components having an operation characteristic controllable with a reference parameter value;
    a plurality of reference registers, in each of which the reference parameter value for determining the operation characteristic of a specific one of said analog components is set;
    a plurality of pairs of a first register and a second register provided in association with said reference registers, each of said first registers storing plural bits of a first parameter value for the first communication mode, and each of said second registers storing plural bits of a second parameter value for the second communication mode;
    a plurality of switches, each provided for each of said reference registers to selectively connect one of said first and second registers to said reference register so as to selectively set the first parameter value or the second parameter value into the reference register in bit parallel as said reference parameter value;
    a switch control circuit for controlling said switch in accordance with a mode selection signal supplied from an external signal line,
    wherein said multimode wireless communication apparatus includes a control unit for supplying said switch control circuit with said mode selection signal through said external signal line so as to cause a radio frequency unit, comprising said high frequency integrated circuit, operate periodically in the first communication mode, for which said multimode wireless communication apparatus has been registered to a base station, to monitor for presence of a call to said multimode wireless communication apparatus, and after a predetermined time interval, to operate in the second communication mode by replacing the reference parameter values of said reference registers, and
    wherein said control unit includes communication mode determining means for selecting communication mode based on a mode selection rule designated in advance by a user of the multimode wireless communication apparatus when a call to said multimode wireless communication apparatus is detected from a signal received during a period in which said radio frequency unit is operating in the first communication mode, thereby suppressing the switching of said radio frequency unit to the second communication mode if the mode selection rule indicates the first communication mode as a preference mode, switching said radio frequency unit to the second communication mode automatically if the mode selection rule indicates the second communication mode as a preference mode, and determining whether communication in the first communication mode should be continued on or not in accordance with an instruction from the user if the mode selection rule indicates a user selection preference mode.

7. The high frequency integrated circuit according to claim 6, further comprising a write control circuit for writing a first parameter for the first communication mode and a second parameter for the second communication mode supplied from said external signal line to said first and second registers, respectively, wherein said mode selection signal is supplied to said switch control circuit via said write control circuit.

8. A high frequency integrated circuit for a multimode terminal apparatus, said high frequency integrated circuit comprising:

plural kinds of analog components that share in processing analog communication signals in both of a first communication mode and a second communication mode different in communication protocol from the first communication mode, each of said analog components having an operation characteristic controllable with a reference parameter value;

a plurality of reference registers, each provided for each of said analog components to hold a reference parameter value for determining the operation characteristic of a specific one of the analog components;

a plurality of pairs of configuration parameter registers, each of said pairs being prepared in association with each of said reference registers and comprised of a pair of a first register for storing plural bits of a parameter value for the first communication mode and a second register for storing plural bits of a parameter value for the second communication mode;

a plurality of switches each for selectively supplying the parameter value stored in one of said pair of first and second registers to one of said reference registers in bit parallel;

a switch control circuit for controlling said switches in accordance with a mode selection signal supplied from an external signal line, wherein said multimode terminal apparatus includes a control unit for supplying said switch control circuit with said mode selection signal through said external signal line so as to cause a radio frequency unit, comprising said high frequency integrated circuit, to operate periodically in the first communication mode for a first period in which said multimode wireless communication apparatus monitors for presence of a call to said multimode wireless communication apparatus, and after a predetermined time interval, to operate in the second communication mode for a second period, and wherein said control unit includes communication mode determining means selecting a communication mode based on a mode selection rule designated in advance by a user of the multimode wireless communication apparatus when a call to said multimode wireless communication apparatus is detected from a signal received during said first period, thereby suppressing the switching of said radio frequency unit to the second communication mode if the mode selection rule indicates the first communication mode as a preference mode, switching said radio frequency unit to the second communication mode automatically if the mode selection rule indicates the second communication mode as a preference mode, and determining whether communication in the first communication mode should be continued on over said time interval and said second period or not in accordance with an instruction from the user if them ode selection rule indicates a user selection preference mode.

9. The high frequency integrated circuit according to claim 8, further comprising a write control circuit for selectively writing the parameter value for the first communication mode and the parameter value for the second communication mode supplied from said external signal line in correspondence with each of said analog components into said first and second registers, wherein said mode selection signal is supplied to said switch control circuit via said write control circuit.

10. The high frequency integrated circuit according to claim 8, wherein at least one of said first and second registers corresponding to specific one of said reference registers is comprised of a read only register for storing a fixed parameter value, and each of the other first and second registers is comprised of a rewritable register storing parameter value.

11. The high frequency integrated circuit according to claim 10, further comprising a write control circuit for selectively writing parameters for the first communication mode and parameters for the second communication mode supplied from said external signal line in correspondence with each of said analog components into said rewritable first and second registers, wherein said mode selection signal is supplied to said switch control circuit via said write control circuit.

12. A high frequency integrated circuit for a multimode terminal apparatus, said high frequency integrated circuit comprising:

plural kinds of analog components that share in processing analog communication signals in both of a first communication mode and a second communication mode different in communication protocol from the first communication mode, each of said analog components having an operation characteristic controllable with a reference parameter value;

a plurality of reference registers each provided for each of said analog components to hold a reference parameter value for determining the operation characteristic of a specific one of the analog components;

a pair of a first register for storing plural bits of a parameter value for the first communication mode and a second register for storing plural bits of a parameter value for the second communication mode, prepared in correspondence with at least one of said reference registers;

a switch for selectively supplying the parameter value stored in one of said first and second registers to said corresponding reference register in bits parallel;

a switch control circuit for controlling said switch in accordance with a mode selection signal supplied from an external signal line;

a write control circuit for selectively writing the parameter for the first communication mode and the parameter for the second communication mode supplied from said external signal line in correspondence with each of said analog components into said first register, said second register, or at least one of said reference registers having no accompanying first and second registers, wherein said mode selection signal is supplied to said switch control circuit via said write control circuit, wherein said multimode terminal apparatus includes a control unit for supplying said switch control circuit with said mode selection signal through said external signal line so as to cause a radio frequency unit, comprising said high frequency integrated circuit, to operate periodically in the first communication mode for a first period in which said multimode wireless communication apparatus monitors for presence of a call to said multimode wireless communication apparatus, and after a predetermined time interval, to operate in the second communication mode for a second period, and wherein said control unit includes communication mode determining means for selecting a communication mode based on a mode selection rule designated in advance by a user of the multimode wireless communication apparatus when a call to said multimode wireless communication apparatus is detected from a signal received during said first period, thereby suppressing the switching of said radio frequency unit to the second communication mode if the mode selection rule indicates the first communication mode as a preference mode, switching said radio frequency unit to the second communication mode automatically if the mode selection rule indicates the second communication mode as a preference mode, and determining whether communication in the first communication mode should be continued on over said time interval and said second period or not in accordance with an instruction from the user if the mode selection rule indicates a user selection preference mode.

13. The multimode wireless communication apparatus according to claim 1, wherein one of said analog components is a filter.

14. The high frequency integrated circuit according to claim 6, wherein one of said analog components is a filter.

15. The high frequency integrated circuit according to claim 8, wherein one of said analog components is a filter.

16. The high frequency integrated circuit according to claim 12, wherein one of said analog components is a filter.

* * * * *